United States Patent [19]

Barbour

[11] Patent Number: 4,639,032
[45] Date of Patent: Jan. 27, 1987

[54] TAIL GATE STEP

[76] Inventor: Edward J. Barbour, Rte. 3, Box 299, Elizabethtown, N.C. 28337

[21] Appl. No.: 667,337

[22] Filed: Nov. 1, 1984

[51] Int. Cl.$^4$ .............................................. B60R 3/02
[52] U.S. Cl. ................. 296/62; 280/164 R; 244/129.6
[58] Field of Search ............ 296/62, 50; 293/118, 293/119; 105/443, 447, 449; 280/163, 164 R, 166; 182/88, 91; 244/129.6; 312/322, 323; 297/431

[56] References Cited

U.S. PATENT DOCUMENTS

| | | | |
|---|---|---|---|
| 1,436,984 | 11/1922 | Follett | 280/166 X |
| 2,547,083 | 4/1951 | Lundgren | 312/323 X |
| 2,568,093 | 9/1951 | Smid et al. | 182/88 |
| 2,647,677 | 8/1953 | Reed | 280/166 X |
| 3,515,406 | 6/1970 | Endsley, Jr. | 280/166 |
| 4,139,078 | 2/1979 | Keller | 280/166 X |
| 4,191,388 | 3/1980 | Barksdale | 296/62 X |
| 4,194,754 | 3/1980 | Hightower | 280/166 |
| 4,445,616 | 5/1984 | Mancusi | 312/323 X |

FOREIGN PATENT DOCUMENTS 105817  11/1938  Australia .............................. 280/166

Primary Examiner—Robert B. Reeves
Assistant Examiner—Russell D. Stormer
Attorney, Agent, or Firm—Mills & Coats

[57] ABSTRACT

This invention is a retractable step which can be either retrofitted to a standard pickup truck type tail gate or can be made into the tail gate during manufacture. In this latter case, the step is of the disappearing type and would not be visible except when extended and folded down to its operative or use position. The above is accomplished through a track and pivot arrangement with the retrofit version having a housing disposed thereover when in the retracted position.

8 Claims, 4 Drawing Figures

000
TAIL GATE STEP

FIELD OF INVENTION

This invention relates to land vehicles and more particularly to truck type vehicles and the means of ingressing and egressing the bed portion thereof.

BACKGROUND OF INVENTION

There has always been a problem in ingressing and egressing into and from the cargo beds of relatively large wheel vehicles whether an oxen cart, a horse drawn wagon, or in more modern time the beds of pickup and similar types of trucks. Even the small or mini pickups which have become popular in recent years have a cargo bed which is between two and a half and three feet off the ground with the four-wheel drive versions in many instances being well in excess of three feet. Standard size pickups average close to three feet in height of the cargo bed with the four-wheel drive versions being on occasions five feet or more in height.

Although these relatively high heights of cargo beds are quite often convenient to load, they are very difficult to ingress and egress into and from.

All standard pickup trucks include tailgates which fold down from vertical to horizontal positions with the horizontal position effectively being an outward extension of the cargo bed and thus disposed at the same height above the ground as such bed. Whether ingressing and egressing a camper disposed within the pickup bed, or to adjust cargo, or for whatever other reason, two to two and a half feet is a large step with three feet or better being extremely difficult if not impossible to accomplish unless the person climbs instead of steps into the truck.

BRIEF DESCRIPTION OF INVENTION

After much research and study into the above-mentioned problems, the present invention has been developed to provide an easily installed, aesthetically pleasing, highly functional retrofit step which is mounted on the outside of the interior wall of the tail gate of a pickup type truck. This ladder extends downwardly a distance approximating the depth of the tail gate when in extended position and retracts to a neat, folded position when not in use.

In the original equipment version, the present invention is built into the tail gate of the truck between the interior and exterior walls thereof with the end of the ladder, when retracted, blending into the edge of such tail gate thus making the ladder effectively unnoticeable when in the retracted position and yet it easily extends in the same manner as the retrofit model.

In view of the above, it is an object of the present invention to provide a retractable ladder for ingressing and egressing the bed of a truck type vehicle.

Another object of the present invention is to provide an extensible, foldable ladder means for aiding in the ingress and egress of pickup truck type vehicles.

Another object of the present invention is to provide a means for retrofittingly adding a readily storable step to a vehicle bed requiring a minimum of space to accommodate the same.

Another object of the present invention is to provide a tail gate mounted step which does not require interior space to swing in order to store the same.

Another object of the present invention is to provide a thin, compact, shield like housing for retractively receiving a pivotable ladder.

Another object of the present invention is to provide a tail gate mounted ladder which retracts interiorly of the tail gate with no exterior projections when retracted and yet is highly efficient when in extended to fold down position.

Other objects and advantages of the present invention will become apparent and obvious from a study of the following description and the accompanying drawings which are merely illustrative of such invention.

DETAILED DESCRIPTION OF INVENTION

Figure 1:
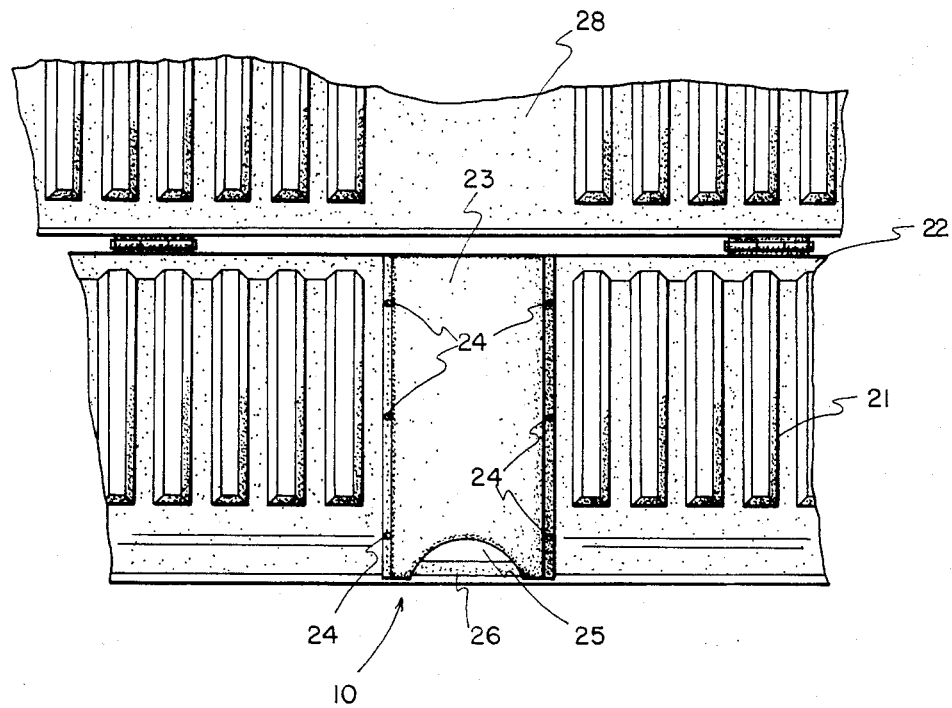
FIG. 1 is a plan view of the retrofit model of the present invention mounted on the outside of the interior wall of a pickup type truck tail gate.

With further reference to the drawings, the retractable vehicle step of the present invention, indicated generally at 10, includes a pair of guide members 11 formed from channel or similar type material. A pair of keeper arms 12 are provided with outwardly projecting stops 13 at one end thereof.

A slot-like opening 14 is provided in one side of each of the guide members 11. Such slot opening is so sized as to slidingly receive stops 13 until the same engages the bottom or interior of such slot as can clearly be seen in FIG. 4.

Each of the keeper arms 12 include a pair of flanges 15 which are adapted to receive a tongue 16 with the flanges and tongues being pivotably connected as indicated at 17. Tongues 16 are fixedly secured to the outer edges of U-shaped step 18.

Figure 3:
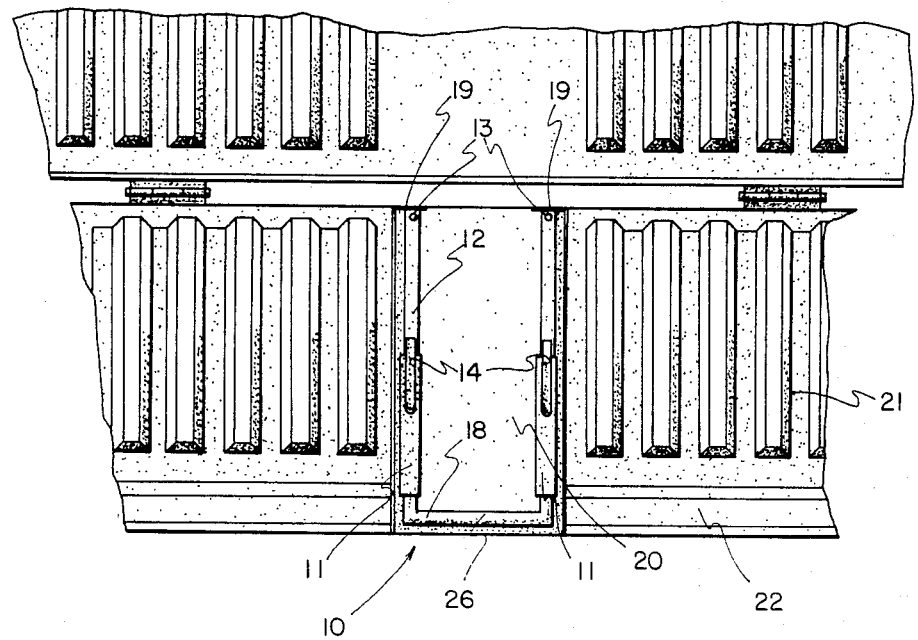
FIG. 3 is a cutaway plan view of the step of the present invention and retracted position.
Figure 4:
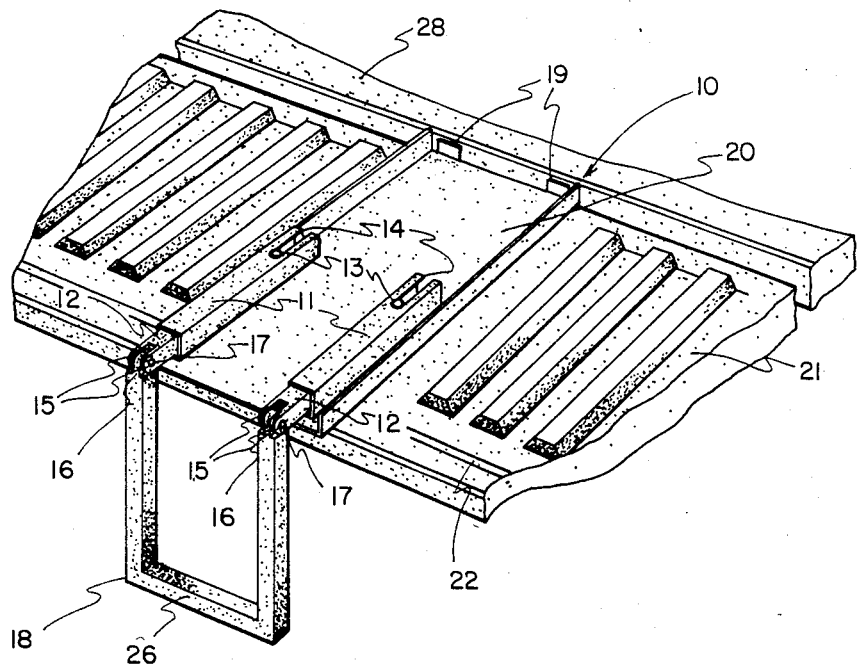
FIG. 4 is a cutaway view of the step of the present invention in extended, downwardly pivoted use position.

If desired, a pair of keeper arm retraction stops 19 can be provided as clearly shown in FIGS. 3 and 4.

In the retrofit model of the present invention, a base plate 20 is provided which has guide members 11 and keeper arm retraction stops 19 fixedly secured thereto. This base plate can be secured to the outside of interior wall 21 of vehicle tail gate 22 by any suitable means such as screw type metal fasteners or by weldment. A relatively flat, aesthetically pleasing cover plate 23 is mounted over base plate 20 and is likewise secured to the interior wall 21 of tail gate 22 by suitable means such as sheet metal screws 24.

An arcuate cutout area 25 is provided for easy access to the tread portion 26 of U-shaped step 18 so that such step can pull from the retracted position shown in FIG. 1 to the extended, ready to use, folded down position shown in FIG. 4.

In the original equipment version of the present invention, the tread portion 26 is formed into the same cross sectional shape as the upper or outer edge portion of tail gate 22. In this version, the tread portion 26 can simply be grasped and pulled from retracted to extended position as hereinabove described for the retrofit model.

Figure 2:
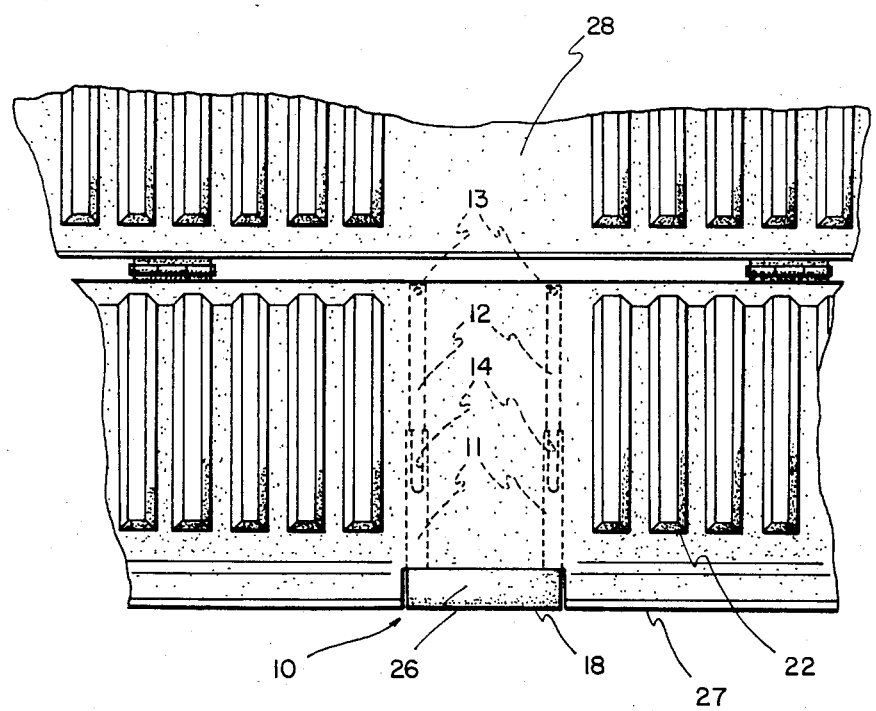
FIG. 2 is a plan view of the tail gate recessed version of the present invention.

To use the retractable vehicle step 10 of the present invention, the same is, of course, either mounted on the outside of the interior wall of the tail gate 22 as described above for the retrofit model or is manufactured interiorly of such tail gate as described and shown in FIG. 2. In either case, whenever it is desired to ingress and/or egress into or from the truck bed area 28, the tail gate 22 is folded down from its normally closed, vertical position to its normally open, horizontal position. The tread portion 26 of the retractable step 10 is then grasped and pulled outwardly until the stops 13 of keeper arms 12 engage the bottom of slot openings 14 of guide members 11. At this point the tongue and flange hinges 15 and 16 are disposed at a point where they can swing about pivot 17 ninety degrees from horizontal to the vertical position shown in FIG. 4. The stops 13 of keeper arms 12 are located at such a point that the U-shaped step 18 can only pivot ninety degrees and no further.

When the step of the present invention is extended as described above, it forms an extremely strong, highly useful step to aid in the ingressing and egressing to and from the truck bed 28. This is particularly useful when a camper and similar means are being used.

To retract the step of the present invention, the U-shaped step portion 18 is simply pivoted from vertical to horizontal position and the same is then pushed inwardly with the keeper arms 12 and the now aligned U-shaped portion 18 sliding through guide members 11 until the keeper arm retraction stops 19 are engaged which will position the tread portion 26 of step member 18 in the retracted position shown in either FIGS. 1 or 2 depending on whether the step is retrofit type or original equipment type.

From the above it can be seen that the present invention has the advantage of providing an extremely compact, easily extendable and retractable vehicle step which requires no interior space for swinging from stored to retracted position and vice versa. In the original equipment version, the step in its retracted position is effectively invisible and even in the retrofit version, it is aesthetically pleasing to the eye. In both versions, the functioning is smooth and efficient, takes up a minimum of space, and is extremely strong even under extremely hard use involving heavy loads. Additionally, the cost of the retractable step means of the present invention is relatively inexpensive and in all cases is aesthetically pleasing to the eye.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An improved step comprising: a pair of generally parallel guide means mounted on a vehicle; keeper means slidingly mounted within each said guide means; stop means mounted on one end of each said keeper means; U-shaped step means pivotally connected to said keeper means on the end opposite said stop means and so sized to retractingly slide within said guide means for storage and to slidingly extend outwardly therefrom during use whereby an extensible and retractable step is provided.

2. The vehicle step of claim 1 wherein said vehicle is of the truck type.

3. The vehicle step of claim 2 wherein said truck is of the pickup type.

4. The vehicle step of claim 3 wherein said pickup truck includes a tail gate having interior and exterior walls.

5. The vehicle step of claim 4 wherein said guide means is mounted on the exterior of said interior wall of said tail gate.

6. The vehicle step of claim 5 wherein a cover for protection and aesthetics is provided over said guide means.

7. The vehicle step of claim 4 wherein said guide means is mounted interiorly of said tail gate between said exterior wall and said interior wall whereby when retracted, such step is hidden from view.

8. The vehicle step of claim 1 wherein said step means is generally U-shaped in configuration and is pivotably mounted to a a pair of keeper means which are slidingly disposed within a pair of guide means.

* * * * *